Dec. 18, 1951 R. V. PFAUTSCH 2,579,395
SHUTTER MOUNTING FOR VENTILATING DUCT OUTLETS
Filed Aug. 4, 1949
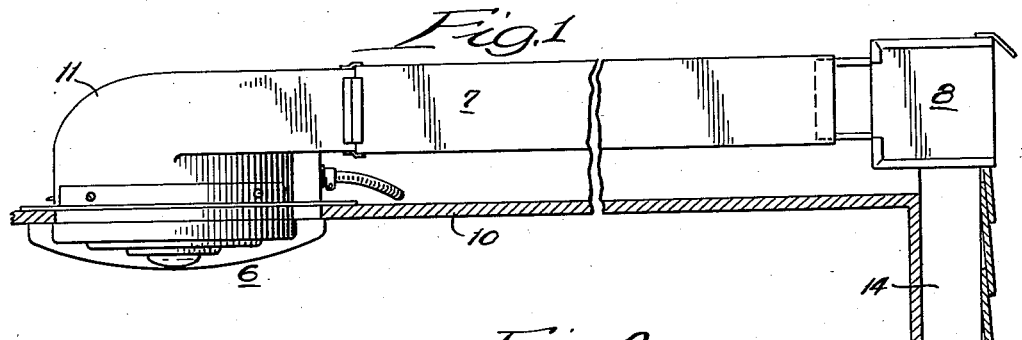
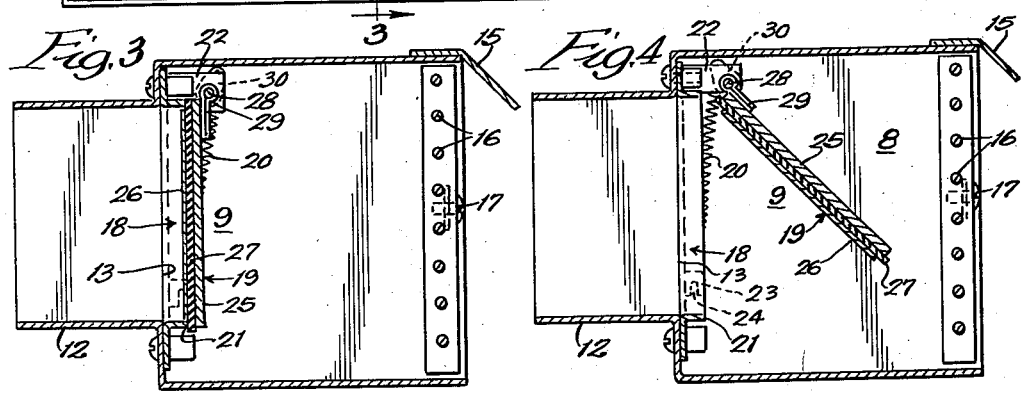
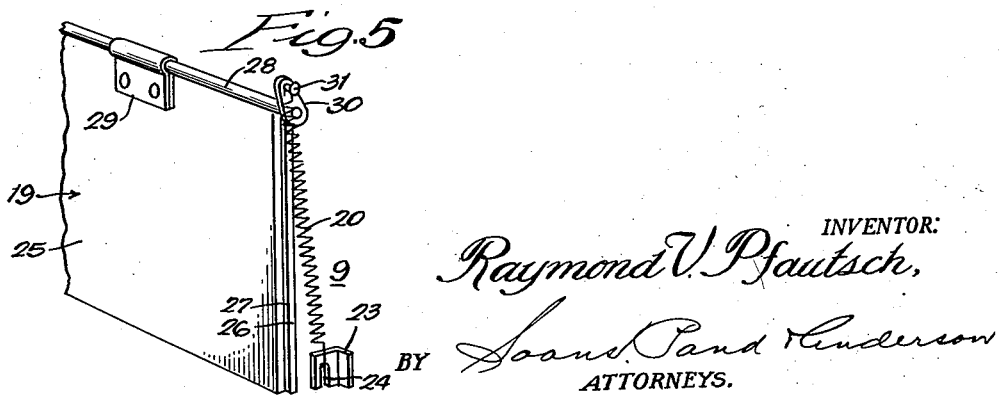
INVENTOR:
Raymond V. Pfautsch,
BY Koons, Pond & Henderson
ATTORNEYS.

Patented Dec. 18, 1951

2,579,395

UNITED STATES PATENT OFFICE 2,579,395

SHUTTER MOUNTING FOR VENTILATING DUCT OUTLETS

Raymond V. Pfautsch, Chicago, Ill., assignor to Ilg Electric Ventilating Company, Chicago, Ill., a corporation of Delaware Application August 4, 1949, Serial No. 108,596

4 Claims. (Cl. 98—116)

The main objects of this invention are to provide an improved form and arrangement of a shutter mounting for a ventilating duct outlet; to provide an improved arrangement of means for yieldingly biasing said shutter toward open or closed position depending upon whether or not air is being exhausted through said duct, whereby said shutter constitutes a minimum obstruction to the exhaust of air when a ventilating fan is in operation, but provides complete weather-tight protection when the ventilating fan is idle; and to provide an improved shutter mounting and biasing means of this kind which is economical to manufacture, easy to install, and positive in operation.

In the accompanying drawings:

Fig. 1 is a fragmentary sectional view through a ceiling and outside wall showing in side elevation a ceiling ventilator and ceiling-concealed duct, for use with which an outlet shutter constructed in accordance with this invention has been designed;

Fig. 2 is an enlarged front elevation of a ventilating-duct outlet-box equipped with a shutter mounting constructed in accordance with this invention, the view being taken from the right-hand end of Fig. 1;

Fig. 3 is an enlarged cross-sectional view of the same taken on the line 3—3 of Fig. 2 showing the shutter in its normally closed position;

Fig. 4 is a similar view showing the shutter in its open position; and

Fig. 5 is an enlarged fragmentary perspective view of one end of the shutter showing the spring arrangement which supplements the action of gravity or the force of the air to hold the shutter closed or open, as the idleness or operation of the ventilating fan may require.

A ventilating system, wherewith this improved shutter mounting has been designed for use, comprises a ceiling fan 6 connected by a ceiling-concealed duct 7 leading to an outlet box or housing 8 wherein is mounted a shutter 9 for the purpose of keeping the duct 7 closed when the ceiling fan 6 is not in operation.

The fan 6 may be of any desired construction and appropriately mounted in the ceiling 10 of the room which is to be ventilated by exhausting air therefrom through the duct 7.

The duct 7 may be of conventional sheet metal or some other material, concealed within the ceiling 10 and connecting an elbow 11, wherein the fan 6 is mounted, with the outlet box 8 which is equipped with this improved shutter 9.

The outlet box 8, in its over-all dimensions, is somewhat larger than the duct 7 and has an integral sleeve part 12 which telescopes with the end of the main duct 7 and constitutes the outlet 13 for said duct 7. This outlet box 8 is set into the outside wall 14 of the house with the open end thereof substantially flush with the outside face of the wall.

A flash cap 15 is mounted along the upper edge of the box 8 and disposed at an incline so as to prevent as much as possible the entrance of rain into the box 8. A grating 16, formed of rods connected to angle bars, is attached to the front of the box 8 by means of screws 17 and prevents birds, squirrels, or other animals from acquiring access to the box 8 or duct 7.

The improved form of shutter 9 for the duct outlet 13 comprises a frame 18 whereon is hinged a door 19 to which is attached a spring 20 to bias the door toward a closed or open position depending upon whether or not the fan 6 is operating to exhaust air through the duct 7.

The frame 18 is a rectangular stamping with a transverse flange 21 defining an opening co-extensive with the duct outlet 13 at the end of the sleeve 12. The frame 18 mounts a pair of lugs 22 and a bracket 23, on the former of which is hinged the door 19 and to the latter of which is connected one end of the spring 20. The lugs 22 are bonded adjacent the upper corners of the frame 18, whereas the bracket 23 is bonded to one of the lower corners of the frame 18. The bracket 23 is provided with an opening in the form of a notch 24 through which one end of the spring 20 is looped. The door 19, as herein shown, comprises a pair of plates 25 and 26 between which is interposed a sheet of material 27.

The plate 25 is formed of a light-weight material, preferably a composition having a minimum capacity for heat conduction. The aim is to reduce as much as possible heat dissipation through the duct 7 when the fan is idle. The plate 25 is of a dimension practically the same as the outside dimension of the flange 21 of the frame 18.

The sheet 27 is preferably of a relatively soft material, such as felt, and is used to provide the best possible seal around the perimeter of the flange 21 of the frame 18 when the door 19 is closed. This sheet of material 27 is held to the plate 25 by the plate 26 which is bonded to the plate 25 by rivets or other fastening means passing through the two plates 25 and 26. The plate 26 is also of light-weight material, low in heat conductivity. The plate 26 is slightly smaller than the interior dimension of the flange 21, thus exposing the perimetrical portion of the sheet 27 to contact the edge of the flange 21.

Although the sheet 27 and the plate 26 are herein shown to be nearly coextensive with the plate 25, as a matter of fact, the sealing of the door 19 against the flange 21 could be effected as well by a rectangular ring or gasket held in place by a rectangular ring riveted to the plate 25.

A shaft or rod 28 is secured along the upper edge of the plate 25 by hinge pads 29. The ends of the shaft 28 extend beyond the lateral edges of the plate 25 to serve as trunnions for swingably mounting the door 19 on the lugs 22. The journaling of the shaft 28 on the lugs 22 is such that when no exhaust is being discharged through the duct 7 gravity tends to swing the door into a vertical position, as shown in Fig. 3, thus bringing a perimetrical area of the sheet 27 into contact with the perimeter of the flange 21 of the frame 18.

A crank 30 is secured to one end of the shaft 28 so that the axis of the pin 31 is offset from the plane of the door plate 25 slightly more than is the axis of the shaft 28, as will most clearly appear from Figs. 3 and 4.

The spring 20 is connected at one end to the lug or bracket 23 on the frame 18 and at the other end to the crank pin 31. Thus, the axis of the spring 20 is disposed transversely to the axis of the shaft 28 in a position on one side or the other of the axis of the shaft 28 depending upon whether the door 19 is in its open or closed position. Such an arrangement of the spring 20 provides a form of toggle so that the spring 20 serves to supplement the action of gravity when there is no exhaust passing through the conduit 7 to secure the door in its closed position, as shown in Fig. 3. However, as soon as there is an exhaust of air passing through the conduit 7, the spring 20 will supplement the force of such draft and tend to hold the door in its open position as shown in Fig. 4.

The operation of this improved shutter mechanism is believed to be apparent from the foregoing description.

Variations and modifications in the details of structure and arrangement of the parts may be resorted to within the spirit and coverage of the appended claims.

I claim:

1. A shutter for a ventilating-duct outlet comprising, a frame having an opening coextensive with said duct outlet, a plate, trunnions on the upper corners of said plate journaled on said frame so that gravity tends to swing said plate to a vertical position to close said frame opening when no air is being discharged through said duct, an eccentric crank pin connected to one of said trunnions and offset from the axis of said trunnions, and a spring connected at one end to said crank pin and at the other end to said frame at a point below said crank so as to dispose the axis of said spring transverse to the axis of said trunnions on respectively opposite sides thereof when said plate is in its open and closed positions, said spring thereby supplementing the action of gravity to hold said plate in vertical position to close said outlet when no air is being discharged through said duct and supplementing the force of air being discharged through said duct to hold said plate in open position.

2. A shutter for a ventilating-duct outlet comprising, a frame having an opening coextensive with said duct outlet, lugs extending transversely outward from said frame adjacent the upper corners, a plate, a shaft fixed along one edge of said plate and having the ends of said shaft extended beyond the ends of said plate to serve as trunnions journaled on said lugs whereby said plate is swingably mounted so that gravity tends to swing said plate to vertical position to close frame opening when no air is being discharged through said duct, an eccentric crank pin connected to one end of said shaft with the axis of said crank pin offset from the axis of said shaft, and a tension spring connected at one end to said crank pin and at the other end to said frame at a point below said crank pin so as to dispose the axis of said spring transverse to the axis of said shaft, and on respectively opposite sides thereof when said plate is in its open and closed positions, said spring thereby supplementing the action of gravity to hold said plate in closed position when no air is being discharged through said duct and supplementing the force of air being discharged through said duct to hold said plate in open position.

3. A shutter for a ventilating-duct outlet comprising, a frame having a transverse flange defining an opening coextensive with said duct outlet, lugs extending transversely outward from said frame adjacent the upper corners thereof and beyond the edge of said flange, a bracket at the lower end of said frame extending transversely outward therefrom and having an opening therein located inwardly of the edge of said frame flange, a plate, trunnions on the upper corners of said plate journaled on said lugs whereby gravity normally tends to swing said plate to vertical position to contact the edge of said frame flange to close said frame opening when no air is being discharged through said duct, an eccentric crank pin connected to one of said trunnions and offset from the axis of said trunnion outwardly of the plane of said plate, and a tension spring having one end connected to said crank pin and the other end connected through said bracket opening so as to dispose the axis of said spring transverse to the axis of said trunnions and on respectively opposite sides thereof when said plate is in its open and closed positions, said spring thereby supplementing the action of gravity to hold said plate in vertical position to close said frame opening when no air is being discharged through said duct and supplementing the force of air being discharged through said duct to hold said plate in open position.

4. A shutter for a ventilating duct comprising an angle bar frame having a vertical flange for attachment to the duct and a horizontal flange defining the outlet opening of the duct, a plate normally disposed vertically in contact with said horizontal flange for closing said opening, means on said frame for hingedly supporting said plate on a horizontal axis above said opening, and an upright tension spring having its lower end connected to said frame and its upper end connected to said plate at a point above said horizontal axis and outwardly of the plane of said plate, said spring supplementing the action of gravity to hold said plate in closed position when no air is being discharged through said duct and supplementing the force of air being discharged through said duct to hold said plate in open position.

RAYMOND V. PFAUTSCH.

REFERENCES CITED

The following references are of record in the file of this patent:

UNITED STATES PATENTS

| Number | Name | Date |
| --- | --- | --- |
| 1,915,994 | Harnett | June 27, 1933 |
| 2,279,425 | Voysey | Apr. 14, 1942 |
| 2,299,832 | Mader | Oct. 27, 1942 |
| 2,355,836 | Willey | Aug. 15, 1944 |
| 2,505,214 | Schrum | Apr. 25, 1950 |